G. N. BLANCHARD.
RECTIFIER.
APPLICATION FILED JULY 28, 1919.

1,357,142.

Patented Oct. 26, 1920.
2 SHEETS—SHEET 1.

Inventor
GEORGE N. BLANCHARD
By Bradley L. Benson
Atty.

G. N. BLANCHARD.
RECTIFIER.
APPLICATION FILED JULY 28, 1919.

1,357,142.

Patented Oct. 26, 1920.
2 SHEETS—SHEET 2.

Inventor
GEORGE N. BLANCHARD
By Bradley L. Benson
Atty.

UNITED STATES PATENT OFFICE.

GEORGE N. BLANCHARD, OF SAN FRANCISCO, CALIFORNIA, ASSIGNOR OF ONE-HALF TO FRED V. HAMMERLY, OF BERKELEY, CALIFORNIA.

RECTIFIER.

1,357,142.

Specification of Letters Patent.

Patented Oct. 26, 1920.

Application filed July 28, 1919. Serial No. 313,930.

*To all whom it may concern:*

Be it known that I, GEORGE N. BLANCHARD, a citizen of the United States, and a resident of the city and county of San Francisco, State of California, have made a new and useful invention—to wit, Improvement in Rectifiers; and I do hereby declare the following to be a full, clear, concise, and exact description of the same.

This invention relates to a rectifier for the purpose of rectifying or changing an alternating electrical current into a direct pulsating current.

The principal object of this invention is to provide a rectifier which will have a large current capacity with low internal resistance, so that large currents can be rectified with small percentage of loss of energy, even at low voltages, it being common at the present time to rectify large currents; but so far as applicant is aware of, this purpose has only been accomplished by the use of direct current dynamos.

Another object of this invention is to produce a rectifier which will operate over long periods of time without attention or adjustment.

Another object is to produce a rectifier which is adapted to electrolytic work and may be also used in the charging of storage batteries, or for motion picture machine arc light operation.

Another object is to produce a rectifier which may be used in the production of chlorin for water and sewage purification wherein the measurement of gas produced is important.

Another object is to produce a rectifier which will be automatic in its operation.

Other objects and advantages of this invention will be disclosed in the detailed description.

In this specification and the annexed drawings, the invention is illustrated in the form considered to be the best, but it is to be understood that the invention is not limited to such form, because it may be embodied in other forms, and it is also to be understood that in and by the claims following the description, it is desired to cover the invention in whatsoever form it may be embodied.

In the accompanying drawings.

Referring to the drawings in detail, like numerals correspond to like parts in the several views.

Figure 1:
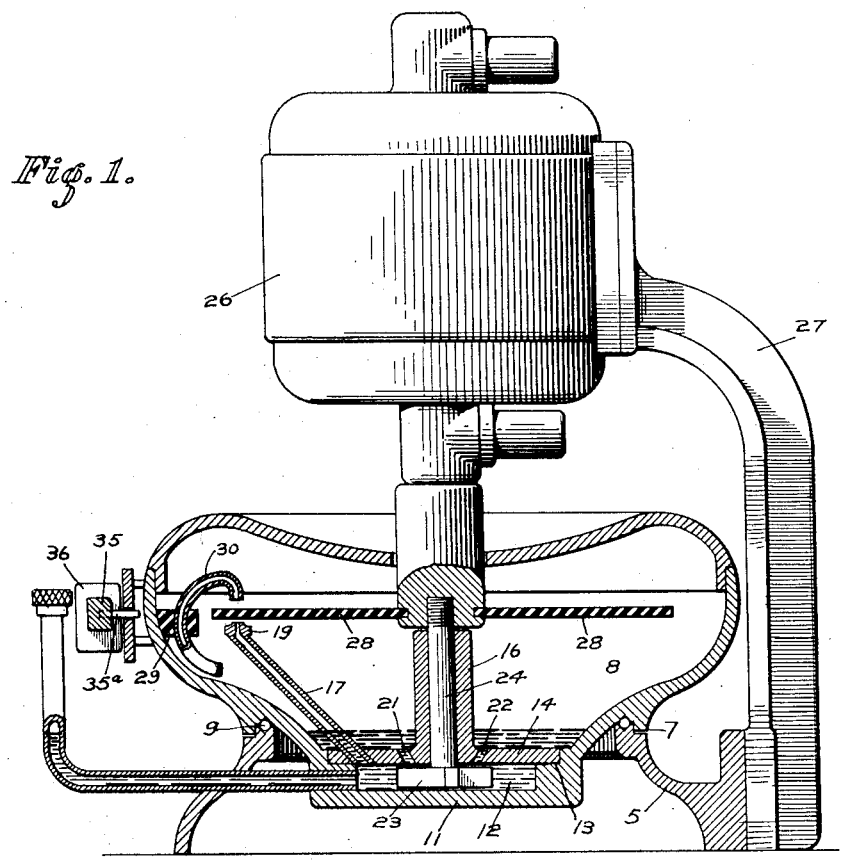
Figure 1 is a side elevation partly in section of my rectifier.
Figure 2:
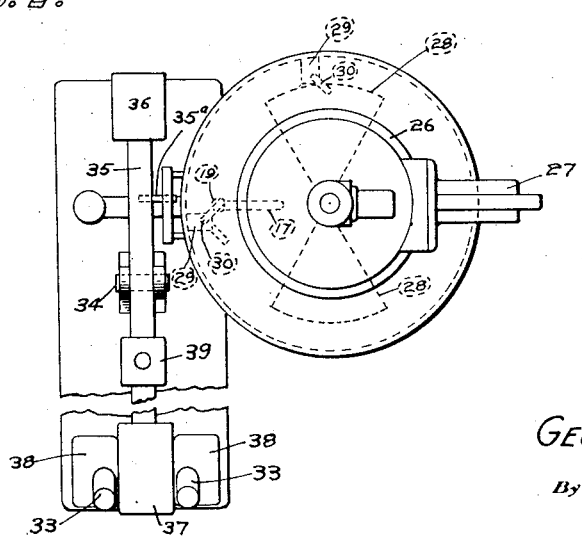
Fig. 2 is a top plan view of the general assembly comprising my rectifier and associated parts.

The numeral 5 designates the base of a rectifier which is circular in form and provided with an annular shoulder which is adapted to receive a depending circular flange 7 formed upon the side of a bowl 8. A suitable raceway is provided between the base and the bowl for the purpose of receiving balls 9 which will allow the bowl 8 to be easily moved upon the base 5, the purpose of which will be hereinafter described.

The bowl 8 is provided with a reduced portion 11, forming a sump 12. This sump is closed through the medium of a cover 14 supported upon the annular shoulder 13. A tubular portion 16 is formed integral with the cover 14 and openings 21 and 22 are formed through the cover 14 adjacent to the tubular portion 16. Two pipes as 17 have communication with the sump 12 through the cover 14 and at a point 90 degrees removed from each other. These pipes are so arranged that they have their opening into the sump near its outer margin and extend upwardly and outwardly and each terminating in a vertical nozzle 19.

Figure 5:
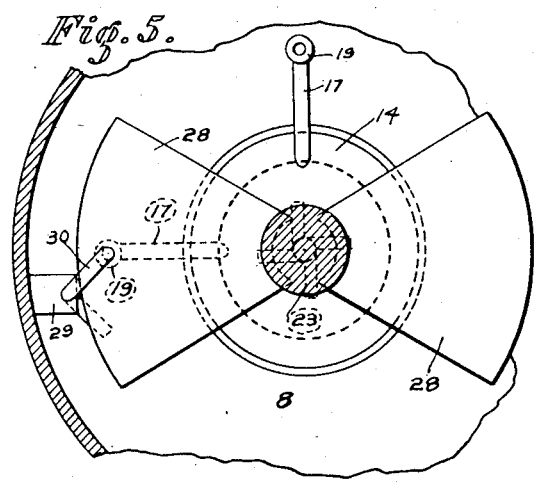
Fig. 5 is a fragmentary top plan of a mercury contact and interrupter.

An impeller 23 is located within the sump 12; said impeller is rotated through the medium of the shaft 24 passing through the tubular portion 16 of the sump cover. This shaft is driven by a motor 26 slidably attached to a support 27 which in turn is supported by the base 5. This motor also rotates blades 28 which are formed of any suitable material, here shown as insulation and cut as shown in Fig. 5. Mounted upon the side of the bowl 8 and at a point 90 degrees removed from each other are insulating blocks 29 having curved tubes 30 mounted therein. The upper ends of these tubes overlie the nozzles 19 and are in advance of the insulating blocks. The lower ends of these tubes are bent rearwardly and inwardly with respect to said blocks, see Fig. 5. The space between the nozzles 19 and the mouth of the tube is sufficient to allow the arms 28 to pass therebetween.

As the source of current is an alternating one, a transformer is employed to furnish the low voltage current to the rectifier. The transformer is also necessary in order to get both waves with only two nozzles and contacts and for the purpose of current regulation. This transformer consists of a stationary primary winding, as shown at 38, having a curved core 33, formed upon an arc struck from the point 34. This point is a pivot for an arm 35 carrying a counter weight 36 at one end, and carrying at its opposite end the secondary winding 37 of the transformer. Thus when a series of impulses are allowed to flow in the primary winding there will be a reaction between its magnetic field and the magnetic field set up by the induced current in the secondary winding, which will vary with changes of current flow in the secondary winding. This reaction will tend to move the secondary winding upward against the action of the sliding weight 39, such motion reducing the induced electromotive force and consequently the current flow. A point will be reached where the two forces will balance and any change in the current flowing through the secondary will disturb the balance causing the secondary to move in a direction to bring back the current to normal. The sliding weight 39 is provided on the arm 35 for the purpose of adjusting the apparatus to produce any desired volume of current. The movement of the arm 35 also acts through a pin 35$^a$ to rotate the bowl 8. This rotation may be accomplished by a cam slot within which the pin 35$^a$ is adapted to move. This arrangement allows movement of the arm 35 to rotate the bowl 8 upon the base 5, so that an automatic regulation is secured. In other words the moving of the bowl moves the contacts with relation to the poles of the motor, thereby changing the point of cut off which prevents arcing.

A synchronous motor is used in the rectifier, as designated at 26, which can fall into step in either of four positions, as it has four poles and as the rectifier has two blades at 180 degrees with two contacts at 90 degrees, the arrangement is such that two motor positions give the reverse polarity; meaning by polarity, direction of flow of current. Thus an alternating current in the primary winding will affect the secondary to cause like alternations to flow therethrough, and as a middle connection is taken from the secondary through a pole changer and load to a ground upon the rectifier bowl the result will be that two secondaries are formed having a common connection and each having a contact in the rectifier, which contacts are 90 degrees removed from each other.

Figure 3:
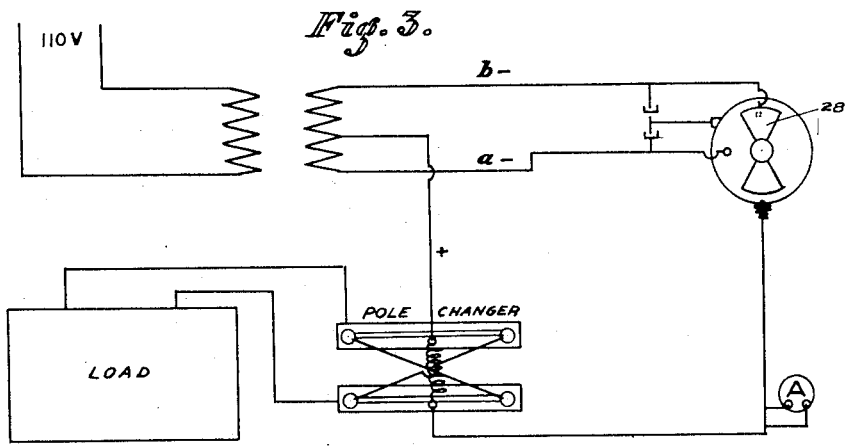
Fig. 3 is the wiring lay out.
Figure 4:
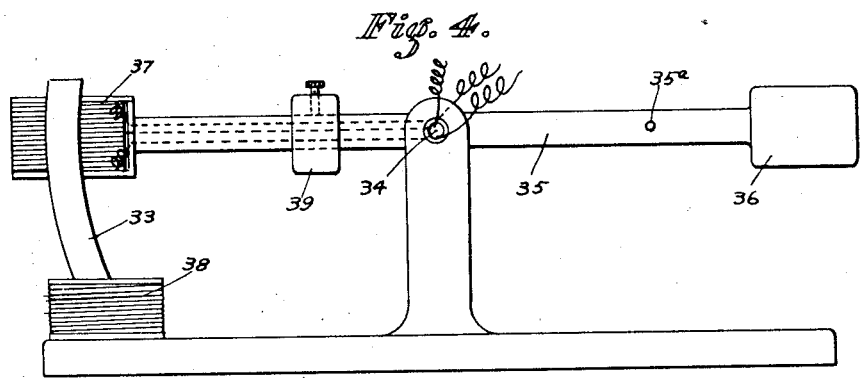
Fig. 4 is a side view of a transformer.

If the parts are in the position shown in Fig. 3, and an alternation is passing through the secondary, so that the wire $a$ is minus, this will make the wire to the pole changer plus; the insulating blade 28 at that instant being in such a position that the mercury stream to the upper rectifying contact is broken, and as the phase changes, the motor will have turned the insulating blade so that the other mercury stream will have been broken, and as the current is reversed the wire $b$ will be a "minus" wire and the center wire to the pole changer will be a "plus" wire, as before. The purpose of a pole changer is to direct the current to the cell or other apparatus in the proper direction depending upon the polarity at which the first impulse is received upon the center wire as the apparatus is started.

As automatic pole changers are common, a description of the same will be unnecessary. It will thus be seen that I have provided a rotary rectifier which is capable of efficiently handling comparatively high amounts of current at a very low voltage, the capacity depending merely upon the size and the capacity of the apparatus, which for ordinary use up to 100 amperes is comparatively small, and will handle this amperage at two to five volts.

Having thus described my invention, what I claim as new and desire to secure by Letters Patent of the United States is as follows:—

1. In a rectifier, the combination of a bowl, a metallic liquid within said bowl, tubes leading upwardly from said bowl, tubes mounted above said first mentioned tubes, means for causing said metallic liquid to flow from said first mentioned tubes to said second tubes, and means for interrupting the flow of liquid between said first mentioned and said second mentioned tubes.

2. In an alternating current rectifier, the combination of a bowl, a metallic liquid within said bowl, tubes leading upwardly from said metallic liquid and adapted to conduct the same upwardly, bent tubes attached to the side of said bowl and having their upper end above said first mentioned tubes, means for interrupting the flow of said liquid from said first mentioned tubes to said curved tubes, and means for slightly moving said bowl.

3. In a rectifier, the combination of a base, a bowl movably secured on said base, a sump formed in said bowl, a cover overlying said sump, tubes extending upwardly from said sump, an impeller within said sump, mercury within said bowl filling said sump and overlying said cover and bent tubes carried by the sides of said bowl and having their upper ends overlying said first mentioned tubes.

4. In a rectifier, the combination of a base, a bowl movably secured on said base, a sump formed in said bowl, a cover overlying said sump, tubes extending upwardly from said sump, an impeller within said sump, mercury within said bowl filling said sump and overlying said cover, bent tubes carried by the sides of said bowl, having their upper ends overlying said first mentioned tubes, said first mentioned tubes being 90 degrees removed from each other.

5. In a rectifier, the combination of a base, a bowl movably secured on said base, a sump formed in said bowl, a cover overlying said sump, tubes extending upwardly from said sump, an impeller within said sump, mercury within said bowl filling said sump and overlying said cover, bent tubes carried by the sides of said bowl, having their upper ends overlying said first mentioned tubes, said first mentioned tubes being 90 degrees removed from each other, and means for rotating said bowl on said base.

6. In a rectifier, the combination of a base, a bowl movably secured on said base, a sump formed in said bowl, a cover overlying said sump, tubes extending upwardly from said sump, an impeller within said sump, mercury within said bowl filling said sump and overlying said cover and adapted to be forced through said tubes, bent tubes carried by the sides of said bowl and insulated therefrom and having their upper ends overlying said first mentioned tubes and adapted to receive a stream of mercury from said first mentioned tubes, said first mentioned tubes being 90 degrees removed from each other, means for rotating said bowl on said base, an alternating current motor mounted above said bowl, said motor having a vertical shaft adapted to rotate said impeller and plates mounted on said shaft above said impeller and adapted to periodically interrupt the mercury stream between said first mentioned and said second mentioned tubes when said motor shaft is being rotated.

7. In a rectifier, the combination of a bowl, a metallic liquid within said bowl, tubes extending from said bowl, tubes having their ends adjacent the ends of said first mentioned tubes, and means for causing said metallic liquid to flow from said first mentioned tubes to said second mentioned tubes.

In testimony whereof I have hereunto set my hand at San Francisco, California, this 21st day of July, 1919.

GEORGE N. BLANCHARD.